United States Patent
Nishi et al.

(10) Patent No.: US 9,174,541 B2
(45) Date of Patent: Nov. 3, 2015

(54) HALOGEN-FREE EXTRA-HIGH-VOLTAGE CABLE FOR RAILWAY ROLLING STOCK

(71) Applicant: Hitachi Metals, Ltd., Tokyo (JP)

(72) Inventors: Hajime Nishi, Hitachi (JP); Motoharu Kajiyama, Takahagi (JP); Yoshiaki Nakamura, Hitachi (JP); Kentaro Segawa, Kudamatsu (JP); Takayuki Tanaka, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 14/190,441

(22) Filed: Feb. 26, 2014

(65) Prior Publication Data

US 2014/0290976 A1 Oct. 2, 2014

(30) Foreign Application Priority Data

Mar. 26, 2013 (JP) .................................. 2013-064323

(51) Int. Cl.
| | |
|---|---|
| *H01B 7/00* | (2006.01) |
| *B60L 5/18* | (2006.01) |
| *H01B 7/295* | (2006.01) |

(52) U.S. Cl.
CPC . *B60L 5/18* (2013.01); *H01B 7/295* (2013.01); *B60L 2200/26* (2013.01)

(58) Field of Classification Search
CPC .................................... H01B 7/00; H01B 7/36
USPC ........... 174/36, 110 R, 110 A–110 M, 120 R, 174/121 R, 120 SC, 121 SC, 122 R, 122 SC
See application file for complete search history.

(56) References Cited

U.S. PATENT DOCUMENTS

| | | | | |
|---|---|---|---|---|
| 3,792,192 | A * | 2/1974 | Plate ........................ | 174/102 SC |
| 6,479,590 | B1 * | 11/2002 | Ikeda et al. .................... | 525/193 |
| 6,506,492 | B1 * | 1/2003 | Foulger ..................... | H01B 1/22 174/110 PM |
| 6,627,819 | B2 | 9/2003 | Hashimoto et al. | |
| 2006/0278425 | A1 * | 12/2006 | Harada et al. ............. | 174/110 R |
| 2010/0231228 | A1 * | 9/2010 | Koelblin et al. ............. | 324/544 |
| 2011/0048765 | A1 * | 3/2011 | Eggertsen ................ | H01B 7/14 174/107 |
| 2012/0003473 | A1 * | 1/2012 | Segawa et al. ................ | 428/389 |

FOREIGN PATENT DOCUMENTS

| | | | | |
|---|---|---|---|---|
| JP | 2000-129049 | | 5/2000 | |
| JP | 2000-294036 | | 10/2000 | |
| JP | 2002-042575 | | 2/2002 | |
| JP | 2003-113276 | | 4/2003 | |
| JP | 2005-200574 | | 7/2005 | |
| JP | 2005-200574 A | * | 7/2005 | ............... H01B 3/00 |
| WO | WO2011/149463 | * | 12/2011 | ............... H01B 7/36 |

\* cited by examiner

*Primary Examiner* — William H Mayo, III
(74) *Attorney, Agent, or Firm* — Roberts Mlotkowski Safran & Cole, PC

(57) ABSTRACT

A halogen-free extra-high-voltage cable for railway rolling stock includes a stranded conductor, an inner semi-conducting layer covering the stranded conductor, an outer semi-conducting layer provided on an outer periphery of the inner semi-conducting layer via an insulation layer, and a sheath layer on an outer periphery of the outer semi-conducting layer, the sheath layer containing 80 to 200 parts by weight of metal hydroxide and 0.5 to 10 parts by weight of cross-linking agent with respect to 100 parts by weight of olefin-based polymer containing ethylene-vinyl acetate copolymer as a main component, the ethylene-vinyl acetate copolymer having a vinyl acetate content of not less than 40 wt % and less than 50 wt % and a melt flow rate of not more than 2.5 g/10 min and a resin composition is cross-linked.

11 Claims, 1 Drawing Sheet

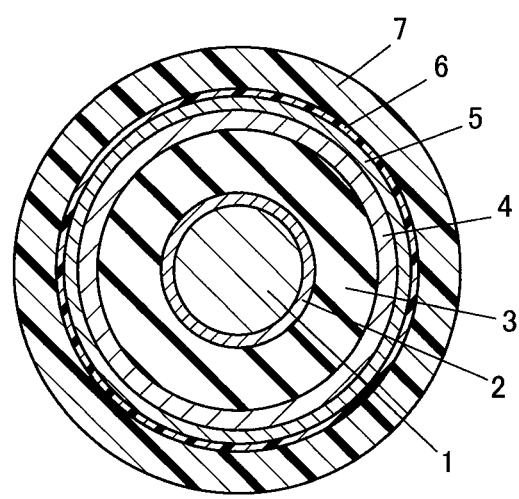

HALOGEN-FREE EXTRA-HIGH-VOLTAGE CABLE FOR RAILWAY ROLLING STOCK

The present application is based on Japanese Patent Application No. 2013-064323 filed on Mar. 26, 2013, the entire contents of which are incorporated herein by reference.

BACKGROUND OF THE INVENTION

1. Field of the Invention

The invention relates to a halogen-free extra-high-voltage cable for railway rolling stock which is excellent in mechanical characteristics, aging resistance, oil resistance, low-temperature characteristics, flame retardancy and safety.

2. Description of the Related Art

In high-speed railway vehicles which need to take high-voltage power therein from overhead lines via pantographs in order to increase travel speed, extra-high-voltage cables for railway rolling stock have been used.

In more detail, the extra-high-voltage cables for railway rolling stock are categorized into a pull-through cable for connecting a pantograph to a transformer placed under the floor of the vehicle and a vehicle-crossover cable connecting between vehicles to supply power.

This type of extra-high-voltage cable for railway rolling stock is required to have electric characteristics as well as mechanical characteristics against flaws or abrasion, environmental resistance such as aging resistance or oil resistance, and flame retardancy. In addition, excellent low-temperature characteristics are also required because of being used in also cold climates.

Accordingly, chloroprene rubber excellent in such characteristics is conventionally used as a sheath material to put such an extra-high-voltage cable into practical use.

However, the extra-high-voltage cable using chloroprene rubber is configured to produce a large amount of non-flammable halogen gas in the event of a fire so that combustion of the cable is prevented by insulating the cable from oxygen. Halogen gases, etc., produced in such occasion are often toxic even though sufficient flame retardancy is exhibited, which means that it is disadvantageous in that smoke containing poisonous gas is produced in a large amount.

Therefore, a halogen-free extra-high-voltage cable for railway rolling stock emphasizing fire safety has been desired, in which a metal hydroxide such as magnesium hydroxide or aluminum hydroxide is mixed as a flame retardant, in place of chloroprene rubber, with a polyolefin-based resin.

Since it is difficult to achieve a combination of sufficient flame retardancy and excellent mechanical characteristics only by use of metal hydroxide, methods in which a phosphorus-containing flame retardant such as red phosphorus is added as a flame-retardant aid (JP-A 2002-42574, JP-A 2002-42575 and JP-A 2003-113276) and methods in which 1,3,5-triazine derivative such as melamine cyanurate is added to ethylene-vinyl acetate copolymer (EVA) with a high vinyl acetate content as a base polymer (Japanese Patent Nos. 3632735, 4398552 and JP-A 2005-200574) have been disclosed in order to use high flame-retardant halogen-free resin compositions for wires and cables.

However, addition of phosphorus-containing flame retardant or 1,3,5-triazine derivative as a flame-retardant aid is not suitable for halogen-free extra-high-voltage cables for railway rolling stock which are required to have fire safety since toxic phosphine (PH3), nitrogen oxide or hydrogen cyanide are produced at the time of combustion even though sufficient flame retardancy is obtained.

SUMMARY OF THE INVENTION

Therefore, it is an object of the invention to provide a halogen-free extra-high-voltage cable for railway rolling stock which is excellent in mechanical characteristics, aging resistance, oil resistance, low-temperature characteristics, flame retardancy and safety.

According to a feature of the invention, a halogen-free extra-high-voltage cable for railway rolling stock, comprises:
a stranded conductor;
an inner semi-conducting layer covering the stranded conductor;
an outer semi-conducting layer provided on an outer periphery of the inner semi-conducting layer via an insulation layer; and
a sheath layer on an outer periphery of the outer semi-conducting layer, the sheath layer containing 80 to 200 parts by weight of metal hydroxide and 0.5 to 10 parts by weight of cross-linking agent with respect to 100 parts by weight of olefin-based polymer containing ethylene-vinyl acetate copolymer as a main component, the ethylene-vinyl acetate copolymer having a vinyl acetate content of not less than 40 wt % and less than 50 wt % and a melt flow rate of not more than 2.5 g/10 min and a resin composition is cross-linked,
in which the sheath layer comprises tensile strength of not less than 8 MPa and breaking elongation of not less than 200% in a test in accordance with HS C 3005, tensile strength retention of not less than 70% and breaking elongation retention of not less than 60% after heating at 100° C. for 168 hours, the tensile strength retention of not less than 60% and the breaking elongation retention of not less than 60% after immersing in IRM 902 oil at 100° C. for 24 hours, the breaking elongation of not less than 100% after cooling at -40° C. for 10 minutes, and the breaking elongation of not less than 30% after cooling at −50° C. for 10 minutes, and
in which the cable comprises char length of not more than 2.5 m in a vertical flame test in accordance with BS 6853.

In the halogen-free extra-high-voltage cable for railway rolling stock, the cross-linking agent may be at least one selected from the group consisting of 1,1-di(t-butylperoxy)cyclohexane, bis(1-methyl-1-phenylethyl)=peroxide, 1,3-di(t-butylperoxy-isopropyl)benzene and 1,3-bis(2-t-butylperoxyisopropyl)benzene.

In the halogen-free extra-high-voltage cable for railway rolling stock, ethylene-propylene rubber, ethylene-butene rubber, ethylene-hexene rubber, ethylene-octene rubber or cross-linked polyethylene may be used for the insulation layer.

EFFECTS OF THE INVENTION

According to the invention, it is possible to provide a halogen-free extra-high-voltage cable for railway rolling stock which is excellent in mechanical characteristics, aging resistance, oil resistance, low-temperature characteristics, flame retardancy and safety.

BRIEF DESCRIPTION OF THE DRAWINGS

Next, the present invention will be explained in more detail in conjunction with appended drawings, wherein:

FIG. 1 is a cross sectional view showing a halogen-free extra-high-voltage cable for railway rolling stock in an embodiment of the present invention.

DETAILED DESCRIPTION OF THE PREFERRED EMBODIMENT

The invention provides a halogen-free extra-high-voltage cable for railway rolling stock comprising a stranded conductor, an inner semi-conducting layer covering the stranded conductor, an outer semi-conducting layer provided on an outer periphery of the inner semi-conducting layer via an insulation layer, and a sheath layer on an outer periphery of the outer semi-conducting layer, in which the sheath achieves tensile strength of not less than 8 MPa and breaking elongation of not less than 200% in a test in accordance with JIS C 3005, tensile strength retention of not less than 70% and breaking elongation retention of not less than 60% after heating at 100° C. for 168 hours, tensile strength retention of not less than 60% and breaking elongation retention of not less than 60% after immersing in IRM 902 oil at 100° C. for 24 hours, breaking elongation of not less than 100% after cooling at −40° C. for 10 minutes, breaking elongation of not less than 30% after cooling at −50° C. for 10 minutes, and the cable achieves char length of not more than 2.5 m in a vertical flame test in accordance with BS 6853.

To achieve this, specifically, a resin composition used for the sheath layer of the halogen-free extra-high-voltage cable for railway rolling stock in the invention contains 80 to 200 parts by weight of metal hydroxide and 0.5 to 10 parts by weight of cross-linking agent with respect to 100 parts by weight of olefin-based polymer in which ethylene-vinyl acetate copolymer (EVA) having a vinyl acetate content of not less than 40 wt % and less than 50 wt % and a melt flow rate (MFR) of not more than 2.5 g/10 min is contained as a main component, and the resin composition is cross-linked.

The "main component" here means a component accounting for not less than 50 wt % of the olefin-based polymer in case of blending two types of polymers and a component accounting for not less than one-third of the total in case of blending three types of polymers.

The halogen-free extra-high-voltage cable for railway rolling stock in the embodiment of the invention will be described below.

The resin composition used for the sheath layer in the present embodiment contains 80 to 200 parts by weight of metal hydroxide and 0.5 to 10 parts by weight of cross-linking agent with respect to 100 parts by weight of olefin-based polymer containing ethylene-vinyl acetate copolymer (EVA) having a vinyl acetate content of not less than 40 wt % and less than 50 wt % and a melt flow rate (MFR) of 0.1 to 2.5 g/10 min as a main component, and the resin composition is cross-linked.

The ethylene-vinyl acetate copolymer (EVA) used in the invention has a vinyl acetate content of not less than 40 wt % and less than 50 wt % and a melt flow rate (MFR) of 0.1 to 2.5 g/10 min, and is used alone or as a mixture with another polyolefin-based resin.

Here, the reason for using ethylene-vinyl acetate copolymer is to improve flame retardancy and to obtain sufficient oil resistance. Meanwhile, the reason for defining a vinyl acetate content of the ethylene-vinyl acetate copolymer to not less than 40 wt % and less than 50 wt % and a melt flow rate to 0.1 to 2.5 g/10 min is that sufficient oil resistance is not obtained with less than 40 wt % due to low polarity while low-temperature characteristics are poor with the vinyl acetate content of not less than 50 wt % since glass-transition temperature increases, causing a decrease in flexibility at low temperature. In addition, a polymer having a MFR of more than 2.5 g/10 min causes a significant decrease in some characteristics such as tensile strength, etc. Note that, the melt flow rate here is a value obtained from measurement at 190° C. and at a load of 2.6 kg in accordance with JIS K 6924. Viscosity higher than 0.1 g/10 min causes a decrease in extrudability, hence, limited to not less than 0.1 g/10 min.

Other ethylene-based polymers and polyolefin-based resins mixed with the ethylene-vinyl acetate copolymer include low-density, medium-density and high-density polyethylene, linear low-density polyethylene, linear very low-density polyethylene, α-olefin copolymer, ethylene-methyl methacrylate copolymer, ethylene methyl acrylate copolymer, ethylene ethyl acrylate copolymer, ethylene-styrene copolymer, ethylene-maleic anhydride copolymer and maleic acid grafted linear low-density polyethylene, etc. These may be used alone or as a mixture of two or more thereof. In addition, those modified with maleic acid, etc., may be used in order to improve adhesion of filler.

Metal hydroxides such as magnesium hydroxide, aluminum hydroxide or calcium hydroxide can be used as a metal hydroxide added to the polymer. These metal hydroxides may be used alone or in combination of two or more. In addition, theses metal hydroxides can be used after surface treatment with a silane coupling agent, a titanate coupling agent, or fatty acid or fatty acid metal salt such as stearate or calcium stearate, etc. In addition, other metal hydroxides may be added in an appropriate amount.

In the invention, the added amount of the metal hydroxide is not less than 80 parts by weight and not more than 200 parts by weight with respect to 100 parts by weight of olefin-based polymer. Sufficient flame retardancy is not obtained when the added amount is less than 80 parts by weight while mechanical characteristics significantly decrease when more than 200 parts by weight.

Meanwhile, examples of the cross-linking agent added to the polymer include 1,1-di(t-butylperoxy)cyclohexane, bis (1-methyl-1-phenylethyl)=peroxide, 1,3-di(t-butylperoxy-isopropyl)benzene and 1,3-bis(2-t-butylperoxyisopropyl) benzene, etc., which can be added in a combination of more than one.

In the invention, the amount of cross-linking agent is 0.5 to 10 parts by weight with respect to 100 parts by weight of olefin-based polymer. When the added amount is less than 0.5 parts by weight, sufficient cross-linking effect is not obtained, resulting in insufficient tensile strength. On the other hand, breaking elongation is insufficient when more than 10 parts by weight.

In the invention, the inner insulation of the cable can be formed of ethylene-propylene rubber (EPR), ethylene-butene rubber, ethylene-hexene rubber, ethylene-octene rubber or cross-linked polyethylene. Among the above, EPR excellent in corona resistance and flexibility is most suitable.

Desirably, the sheath material is applied and subsequently cross-linked at 145° C. for 60 minutes when manufacturing the halogen-free extra-high-voltage cable for railway rolling stock of the invention.

In addition, additives such as antioxidants, lubricants, softeners, plasticizers, inorganic fillers, compatibilizing agents, stabilizers, carbon black and colorants can be added, if necessary, to the sheath material.

EXAMPLES

An example of the halogen-free extra-high-voltage cable for railway rolling stock in the invention will be described in reference to FIG. 1.

FIG. 1 is a diagram illustrating a cable in which an inner semi-conducting layer 2 is wrapped around a tin-plated copper stranded conductor 1, an insulation 3 is applied thereon to form an insulation layer, an outer semi-conducting layer 4 and a shielding layer 5 are provided thereon, a binder tape 6 is applied and a sheath layer 7 is formed as the outermost layer by extrusion-coating. The sheath layer 7 is prepared from the halogen-free resin composition of the invention.

The halogen-free extra-high-voltage cable for railway rolling stock was manufactured as follows.

A tin-plated copper stranded conductor (stranded with tin-plated annealed copper wires) with an inner semi-conducting layer (inner semi-conducting tape) wrapped therearound was covered with an inner insulation resin (EPR) and the inner insulation resin was cross-linked by exposure to steam at 1.8 MPa for 1 minute. Then, after an outer semi-conducting layer (outer semi-conducting tape), a shielding layer (copper braid shield) and a binder tape were sequentially wrapped therearound, a sheath layer was formed thereon. Here, components blended at blending ratios shown in Table 1 (Examples 1 to 6) and Table 2 (Comparative Examples 1 to 7) were kneaded using a pressure kneader at an initial temperature of 40° C. and an end temperature of 140° C., the kneaded mixture was pelletized and used as a sheath material of the cable shown in FIG. 1, and the sheath layer was formed by extruding the sheath material at a preset temperature of 90° C. so as to have a thickness of 3 mm. Lastly, after covering the sheath layer with lead, the sheath material was cross-linked by heating at 145° C. for 60 minutes.

The cables were evaluated by the following methods.

Evaluations of mechanical characteristics, aging resistance, oil resistance and low-temperature characteristics were performed on samples of the insulation and sheath which were taken from the obtained cables and were each cut into a 1 mm-thick sheet. Evaluation of flame retardancy was performed on the cables per se.

Mechanical characteristics, aging resistance and oil resistance were evaluated in accordance with JIS C 3005, low-temperature characteristics were evaluated in accordance with JIS C 3660 and flame retardancy was evaluated in accordance with BS 6853. For characteristics of the sheath, the samples having tensile strength of not less than 8 MPa and breaking elongation of not less than 200% were regarded as passed the test. For aging characteristics, the samples having tensile strength retention of not less than 70% and breaking elongation retention of not less than 60% after heating in a constant-temperature oven at 100° C. for 168 hours were regarded as passed the test. For oil resistance, the samples having retention of not less than 60% in tensile strength and breaking elongation after immersing in test oil, IRM 902, at 100° C. for 24 hours were regarded as passed the test. For low-temperature characteristics, the samples having breaking elongation of not less than 100% and not less than 30% after cooling in a chamber respectively at −40° C. and −50° C. for 10 minutes were regarded as passed the test.

For flame retardancy, a vertical flame test (installation of a single cable) was conducted in accordance with BS 6853 and the cables with a char length of not more than 2.5 m were regarded as "passed the test".

Examples manufactured using the resin composition of the invention are shown in Table 1 and Comparative Examples made in the same manner as the above are shown in Table 2.

TABLE 1

| | | | | Target | | | Examples | | | |
|---|---|---|---|---|---|---|---|---|---|---|
| | Items | | | value | 1 | 2 | 3 | 4 | 5 | 6 |
| Compositions | EVA (VA = 33 wt %, MFR = 1.0 g/10 min) (EV170 from Du Pont-Mitsui Polychemicals) | | | | | | 40 | | | |
| | EVA (VA = 41 wt %, MFR = 0.3 g/10 min) (V9000 from Du Pont-Mitsui Polychemicals) | | | | 30 | | 37 | 30 | 30 | 30 |
| | EVA (VA = 46 wt %, MFR = 2.5 g/10 min) (EV45LX from Du Pont-Mitsui Polychemicals) | | | | 70 | 100 | | 70 | 70 | 70 |
| | EVA (VA = 46 wt %, MFR = 100 g/10 min) (EV45X from Du Pont-Mitsui Polychemicals) | | | | | | 15 | | | |
| | EVA (VA = 50 wt %) (LEVAPREN 500 from LANXESS) | | | | | | | | | |
| | Maleic acid modified α-olefin copolymer (MH7020 from Mitsui Chemicals) | | | | | | 8 | | | |
| | Al(OH)$_3$ (BF013STV from Nippon Light Metal) | | | | 40 | 40 | | 40 | 40 | 40 |
| | Mg(OH)$_2$ (Kisuma 5L from Kyowa Chemical Industry) | | | | 60 | 40 | | 60 | 60 | 60 |
| | Mg(OH)$_2$ (Magseeds S4 from Konoshima Chemical) | | | | | | 200 | | | |
| | 1,1-di(t-butylperoxy)cyclohexane (Torigonox 22-70E from Kayaku Akzo) | | | | 2.5 | 0.5 | 10 | | | |
| | Bis(1-methyl-1-phenylethyl) = peroxide (DCP from NOF Corp.) | | | | | | | 2.5 | | |
| | 1,3-di(t-butylperoxy-isopropyl)benzene (PERBUTYL P from NOF Corp.) | | | | | | | | 2.5 | |
| | 1,3-bis(2-t-butylperoxyisopropyl)benzene (Perkadox 14SFL from Kayaku Akzo) | | | | | | | | | 2.5 |
| | Antioxidant (Nocrac 224 from Ouchi Shinko Chemical industrial) | | | | 1 | 1 | | 1 | 1 | 1 |
| | Antioxidant (Irganox from Chiba Japan) | | | | | | 0.5 | | | |
| Characteristics | Sheath | Mechanical characteristics | Tensile strength (MPa) | Not less than 8 | 10.4 | 8.6 | 12.8 | 11.1 | 10.8 | 11.2 |
| | | | Elongation (%) | Not less than 200 | 457 | 480 | 200 | 457 | 423 | 417 |
| | | Aging resistance 100° C. × 168 hours | Tensile strength retention (%) | Not less than 70 | 111 | 100 | 112 | 95 | 100 | 108 |
| | | | Elongation retention (%) | Not less than 60 | 98 | 103 | 105 | 102 | 102 | 105 |
| | | Oil resistance 100° C × 24 hours | Tensile strength retention (%) | Not less than 60 | 83 | 76 | 68 | 85 | 89 | 91 |
| | | | Elongation retention (%) | Not less than 60 | 83 | 72 | 76 | 86 | 89 | 92 |
| | | Low-temperature characteristics | Elongation at −40° C. (%) | Not less than 100 | 110 | 105 | 108 | 105 | 115 | 115 |
| | | | Elongation at −50° C. (%) | Not less than 3 | 65 | 54 | 70 | 65 | 75 | 88 |
| | | Flame retardancy | Char length (m) | Not more than 2.5 | 1.9 | 2.1 | 0.5 | 1.8 | 1.9 | 2.0 |

(Unit: parts by weight)

TABLE 2

|  | Items | | Target value | Comparative Examples | | | | | | |
|---|---|---|---|---|---|---|---|---|---|---|
|  |  |  |  | 1 | 2 | 3 | 4 | 5 | 6 | 7 |
| Compositions | EVA (VA = 33 wt %, MFR = 1.0 g/10 min) (EV170 from Du Pont-Mitsui Polychemicals) | | | 100 | | | | | | |
|  | EVA (VA = 41 wt %, MFR = 0.3 g/10 min) (V9000 from Du Pont-Mitsui Polychemicals) | | | | | 100 | 100 | 100 | 100 | 30 |
|  | EVA (VA = 46 wt %, MFR = 2.5 g/10 min) (EV45LX from Du Pont-Mitsui Polychemicals) | | | | | | | | | |
|  | EVA (VA = 46 wt %, MFR = 100 g/10 min) (EV45X from Du Pont-Mitsui Polychemicals) | | | | | | | | | 70 |
|  | EVA (VA = 50 wt %) (LEVAPREN 500 from LANXESS) | | | | 100 | | | | | |
|  | Maleic acid modified α-olefin copolymer (MH7020 from Mitsui Chemicals) | | | | | | | | | |
|  | Al(OH)$_3$ (BF013STV from Nippon Light Metal) | | | | | | | | | |
|  | Mg(OH)$_2$ (Kisuma 5L from Kyowa Chemical Industry) | | | 80 | 200 | 70 | 210 | 80 | 200 | 80 |
|  | Mg(OH)$_2$ (Magseeds S4 from Konoshima Chemical) | | | | | | | | | |
|  | 1,1-di(t-butylperoxy)cyclohexane (Torigonox 22-70E from Kayaku Akzo) | | | 2.5 | 2.5 | 2.5 | 2.5 | 0.1 | 10.5 | 2,5 |
|  | Antioxidant (Nocrac 224 from Ouchi Shinko Chemical industrial) | | | 1 | 1 | 1 | 1 | 1 | 1 | 1 |
|  | Antioxidant (Irganox from Chiba Japan) | | | | | | | | | |
| Characteristics | Sheath | Mechanical characteristics | Tensile strength (MPa) | Not less than 8 | 10.3 | 10.1 | 10.2 | 10.1 | 7.8 | 13.2 | 5.6 |
|  |  |  | Elongation (%) | Not less than 200 | 463 | 205 | 502 | 190 | 665 | 157 | 120 |
|  |  | Aging resistance 100° C. × 168 hours | Tensile strength retention (%) | Not less than 70 | 107 | 115 | 124 | 113 | 121 | 110 | 72 |
|  |  |  | Elongation retention (%) | Not less than 60 | 102 | 106 | 103 | 105 | 96 | 95 | 61 |
|  |  | Oil resistance 100° C. × 24 hours | Tensile strength retention (%) | Not less than 60 | 58 | 75 | 92 | 69 | 61 | 78 | 65 |
|  |  |  | Elongation retention (%) | Not less than 60 | 55 | 78 | 90 | 83 | 59 | 81 | 70 |
|  |  | Low-temperature characteristics | Elongation at −40° C. (%) | Not less than 100 | 121 | 90 | 105 | 93 | 32 | 111 | 21 |
|  |  |  | Elongation at −50° C. (%) | Not less than 3 | 76 | 28 | 63 | 32 | 20 | 67 | 5 |
|  |  | Flame retardancy | Char length (m) | Not more than 2.5 | 2.1 | 0.5 | 2.9 | 0.4 | 2.2 | 0.6 | 2.2 |

(Unit: parts by weight)

As shown in Table 1, all of Examples 1 to 6 in the invention are excellent in mechanical characteristics, aging resistance, oil resistance, low-temperature characteristics and flame retardancy. Further, toxic phosphine (PH3), nitrogen oxide or hydrogen cyanide are not produced at the time of combustion since phosphorus-containing flame retardant or 1,3,5-triazine derivative are not added as a flame-retardant aid, hence, also excellent in safety.

As such, the halogen-free extra-high-voltage cables for railway rolling stock in Examples of the invention maintain mechanical characteristics, flame retardancy, aging resistance and oil resistance and, at the same time, do not produce toxic phosphine (PH3), nitrogen oxide or hydrogen cyanide at the time of combustion since phosphorus-containing flame retardant or 1,3,5-triazine derivative are not added as a flame-retardant aid, hence, excellent in safety. In addition, excellent low-temperature characteristics are also exhibited and it is thus sufficiently reliable even when used in cold climates.

On the other hand, in Comparative Example 1 having less vinyl acetate content than as defined in the invention, oil resistance is insufficient due to low polarity. In Comparative Example 2 having more vinyl acetate content than as defined in the invention, flexibility at low temperature is poor due to high glass-transition temperature and low-temperature characteristics are thus insufficient. Flame retardancy is insufficient in Comparative Example 3 in which the added amount of metal hydroxide is below the defined amount while mechanical characteristics and low-temperature characteristics are insufficient in Comparative Example 4 in which the added amount of metal hydroxide is above the defined amount. Tensile strength and low-temperature characteristics are insufficient in Comparative Example 5 in which the added amount of cross-linking agent is below the defined amount while breaking elongation is insufficient in Comparative Example 6 in which the added amount of cross-linking agent is above the defined amount. In addition, mechanical characteristics are insufficient in Comparative Example 7 in which the main component is ethylene-vinyl acetate copolymer having a higher melt flow rate than the defined value.

As such, the halogen-free extra-high-voltage cable for railway rolling stock in the invention are excellent in mechanical characteristics, aging resistance, oil resistance, low-temperature characteristics, flame retardancy and safety and has high industrial utility.

Although the invention has been described with respect to the specific embodiment for complete and clear disclosure, the appended claims are not to be therefore limited but are to be construed as embodying all modifications and alternative constructions that may occur to one skilled in the art which fairly fall within the basic teaching herein set forth.

What is claimed is:

1. A halogen-free extra-high-voltage cable for railway rolling stock, comprising:
   a stranded conductor;
   an inner semi-conducting layer covering the stranded conductor;
   an outer semi-conducting layer provided on an outer periphery of the inner semi-conducting layer via an insulation layer; and
   a sheath layer on an outer periphery of the outer semi-conducting layer, the sheath layer containing 80 to 200 parts by weight of metal hydroxide and 0.5 to 10 parts by weight of cross-linking agent with respect to 100 parts by weight of olefin-based polymer containing at least 50 parts by weight ethylene-vinyl acetate copolymer, the ethylene-vinyl acetate copolymer having a vinyl acetate content of not less than 40 wt % and less than 50 wt % and a melt flow rate of not more than 2.5 g/10 min and a resin composition is cross-linked,
   wherein the sheath layer comprises mechanical characteristics of tensile strength of not less than 8 MPa and breaking elongation of not less than 200% in a test in accordance with JIS C 3005, aging resistance of tensile strength retention of not less than 70% and breaking elongation retention of not less than 60% after heating at 100° C. for 168 hours, oil resistance of the tensile strength retention of not less than 60% and the breaking elongation retention of not less than 60% after immersing in IRM 902 oil at 100° C. for 24 hours, low temperature characteristics of the breaking elongation of not less than 100% after cooling at −40° C. for 10 minutes, and the breaking elongation of not less than 30% after cooling at −50° C. for 10 minutes, and
   wherein the cable comprises flame retardancy of char length of not more than 2.5 m in a vertical flame test in accordance with BS 6853.

2. The halogen-free extra-high-voltage cable for railway rolling stock according to claim 1, wherein the cross-linking agent is at least one selected from the group consisting of 1,1-di(t-butylperoxy)cyclohexane, bis(1-methyl-1-phenyl-ethyl)=peroxide, 1,3-di(t-butylperoxy-isopropyl) benzene and 1,3-bis(2-t-butylperoxyisopropyl)benzene.

3. The halogen-free extra-high-voltage cable for railway rolling stock according to claim 1, wherein ethylene-propylene rubber, ethylene-butene rubber, ethylene-hexene rubber, ethylene-octene rubber or cross-linked polyethylene is used for the insulation layer.

4. The halogen-free extra-high-voltage cable for railway rolling stock according to claim 1, wherein the sheath layer is consisted of a single layer.

5. The halogen-free extra-high-voltage cable for railway rolling stock according to claim 1, further comprising:
   a shielding layer provided on the outer semi-conducting layer.

6. The halogen-free extra-high-voltage cable for railway rolling stock according to claim 5, wherein the shielding layer comprises a copper braid shield.

7. The halogen-free extra-high-voltage cable for railway rolling stock according to claim 1, further comprising:
   a binder tape.

8. The halogen-free extra-high-voltage cable for railway rolling stock according to claim 1, wherein the melt flow rate of the ethylene-vinyl acetate copolymer is not less than 0.1 g/10 min.

9. The halogen-free extra-high-voltage cable for railway rolling stock according to claim 1, wherein the sheath layer is provided as an outermost layer.

10. The halogen-free extra-high-voltage cable for railway rolling stock according to claim 1, wherein the ethylene-vinyl acetate copolymer contained in the olefin-based polymer is not less than one-third of the olefin-based polymer.

11. The halogen-free extra-high-voltage cable for railway rolling stock according to claim 1, wherein the ethylene-vinyl acetate copolymer contained in the olefin-based polymer is not less than 50 wt % of the olefin-based polymer.

* * * * *